United States Patent [19]

McCord

[11] 4,313,311

[45] Feb. 2, 1982

[54] VAPOR GENERATING AND RECOVERING APPARATUS

[76] Inventor: James W. McCord, 9101 Nottingham Pkwy., Louisville, Ky. 40222

[21] Appl. No.: 44,955

[22] Filed: Jun. 4, 1979

[51] Int. Cl.³ .......................... F25B 41/00; B01D 3/00
[52] U.S. Cl. ..................................... 62/197; 62/238.6; 203/DIG. 4
[58] Field of Search ............. 62/238 E, 324 D, 324 C, 62/184, 526, 503, 197, 467 RR, 500; 134/10, 12; 203/2, DIG. 4, 21, DIG. 8

[56] References Cited

U.S. PATENT DOCUMENTS

| | | | |
|---|---|---|---|
| 2,310,569 | 2/1943 | Booth | 134/12 |
| 2,632,303 | 3/1953 | Smith | 62/526 X |
| 3,248,305 | 4/1966 | Williamson | 203/DIG. 4 X |
| 3,388,558 | 6/1968 | Harnish | 62/503 X |
| 3,402,566 | 9/1968 | Leimbach | 62/197 |
| 3,869,351 | 11/1973 | Schwartzman | 203/26 X |
| 4,003,798 | 1/1977 | McCord | 62/183 X |
| 4,023,946 | 5/1977 | Schwartzman | 62/467 PR |
| 4,218,891 | 8/1980 | Schwartzman | 62/500 |

Primary Examiner—William E. Wayner
Assistant Examiner—Harry Tanner
Attorney, Agent, or Firm—Charles G. Lamb

[57] ABSTRACT

A vapor generating and recovering apparatus for vaporizing a liquid and condensing a vapor, the apparatus including a container having a liquid therein with a heating and cooling system in heat transfer relation with the liquid and vapor in the container. The heating and cooling system includes means to vaporize the liquid and means to condense the vaporized liquid disposed within the container, and, means to compress a refrigerant. The means to compress the refrigerant is in fluid communication on its high pressure side with the means to vaporize the liquid and on its low pressure side with the means to condense the vaporized liquid. The apparatus further includes a heat exchanger within the container for removing excess heat therefrom.

13 Claims, 3 Drawing Figures

VAPOR GENERATING AND RECOVERING APPARATUS

BACKGROUND OF THE INVENTION

This invention relates to a vapor generating and recovering apparatus for vaporizing a liquid and condensing a vapor and more particularly relates to an improved apparatus for vaporizing a liquid and condensing a vapor in combination with a heating and cooling system.

In the present state of the art, vapor generating and recovering devices for vaporizing and condensing a liquid are utilized in many different areas. For example, in the cleaning of objects such as metallic tools, plastic parts, and the like, hot or boiling solvents have been utilized to remove undesirable soluble and particulate matter from these tools, parts, and the like by immersing the soiled object into hot or boiling solvent. In bringing the solvent to a boiling temperature, a solvent vapor zone is created above the boiling solvent solution in the tank or chamber in which objects may be placed for cleaning. The vaporized solvent is then subjected to cooling or condensing means and is recovered. Generally, the chamber tank from which the solvent is vaporized is filtered or processed by other means to remove the contaminants therefrom and then used.

One example of a heating and cooling system which is utilized in the prior art is described in U.S. Pat. No. 4,003,798. However, this system is specifically directed for use with an apparatus including separate vaporizing and condensing chambers and the liquid to be vaporized includes at least two components therein and must use a bypass system.

SUMMARY OF THE INVENTION

It has now been found that a vapor generating and recovering apparatus for vaporizing a liquid and then condensing the vaporized liquid in the cleaning of objects, the cleaning can be accomplished by the utilization of a heating and cooling system which utilized substantially all of the energy supplied to a refrigeraton system with little or no waste wherein at least one chamber is utilized for both vaporization and condensation, and the liquid may be a single component, which is, if used in a cleaning, reclamation, or developing application, a liquid solvent of a low molecular weight halogenated hydrocarbon, such as, for example, trichloromonoflouromethane, methylene chloride, trichlorotrifluoroethane, methyl chloroform and the like.

In the present invention, the heating and cooling system includes a refrigerant compressor, a main refrigerant condenser, expansion means, and a refrigerant evaporator wherein the condenser and evaporator are disposed withing a container which includes the liquid therein for removing heat from the system. Also disposed within the container is a heat exchanger in heat exchange relation with a heat exchange source outside the aforementioned heating and cooling system to remove excess heat from the container during vaporization and condensation of the liquid.

In the heating and cooling system more energy is available to this system as heat due to the motor input energy and the motor inefficiencies of the refrigeration system and must be removed. Some of this heat is removed by radiant energy loss, by conduction of heat through the apparatus, and by heat absorbed by the parts being processed. There are occasions where these techniques of heat rejection are not sufficient to totally balance the system. This excess energy removal is accomplished in this system by the use of a heat exchanger disposed in heat transfer relation with the system to remove excess heat therefrom. This heat exchanger is placed within the container to remove heat from the liquid or the vapor during vaporization and condensation. The heat exchanger dissipates heat energy by an externally cooled water, air or refrigerant device. The mechanism of cooling is done automatically by a thermostatic or pressure control device. The pressure device generally monitors the head pressure and thereby automatically adjusts the cooling mechanism. The thermostatic control device generally senses the vapor level in the apparatus in such a manner that ambient conditions do not effect its operation. In the case of air cooled heat exchangers, the thermostatic sensor or pressure sensor varies the fan speed. In the case of water cooled heat exchangers, the flow of water is adjusted automatically to remove only the unused energy by again sensing the vapor or pressure rise. A water control valve may be located on the input or output water line of the exchanger.

When more than one chamber is utilized for vaporizing or heating a liquid and then condensing the vaporized liquid, the main condenser may either be placed in series or in parallel with other chambers to provide heat emitting requirements. The solution in other chambers may boil or be heated below the boiling point.

It has also been found that with the utilization of the aforementioned type system the principles of latent energy have been incorporated. This means that the refrigerant boils in the evaporator which in turn condenses the solvent and the refrigerant liquifies in the condenser while the solvent boils, the solvent being vaporized therefrom. Uniform temperature is experienced throughout these portions of the system to provide for better economics in the recovery of solvents. In addition, the temperature of the refrigeration condenser unit is of reasonably low temperature and is not sufficient to decompose the solvent utilized. This provides a degree of safety experienced from this apparatus.

More particularly, in a vapor generating and recovering apparatus for vaporizing a liquid and condensing a vapor, including a housing having at least one compartment therein, the compartment having a liquid therein, the improvement comprising:

A heating and cooling system in heat transfer relation with the liquid and the vapor in the compartment, the system including within the compartment a main condenser in heat emitting relation with the liquid and a main evaporator in heat absorbing relation with the vapor; at least one heat exchanger in heat absorbing relation in the system disposed within said compartment, the at least one exchanger being in heat exchange relation with externally disposed heat absorbing means; and, means to compress a refrigerant, the means to compress being in fluid communication on its high pressure side with the main condenser and on its low pressure side with the main evaporator, the system including expansion means disposed between the main condenser and the main evaporator.

In preferred utilization of the vapor generating and recovery devices of the present invention, specifically in relation to a vapor cleaning device, a more fully described apparatus is hereinafter discussed.

BRIEF DESCRIPTION OF THE DRAWINGS

Referring to the drawings.

DESCRIPTION OF THE PREFERRED EMBODIMENTS

Figure 1:
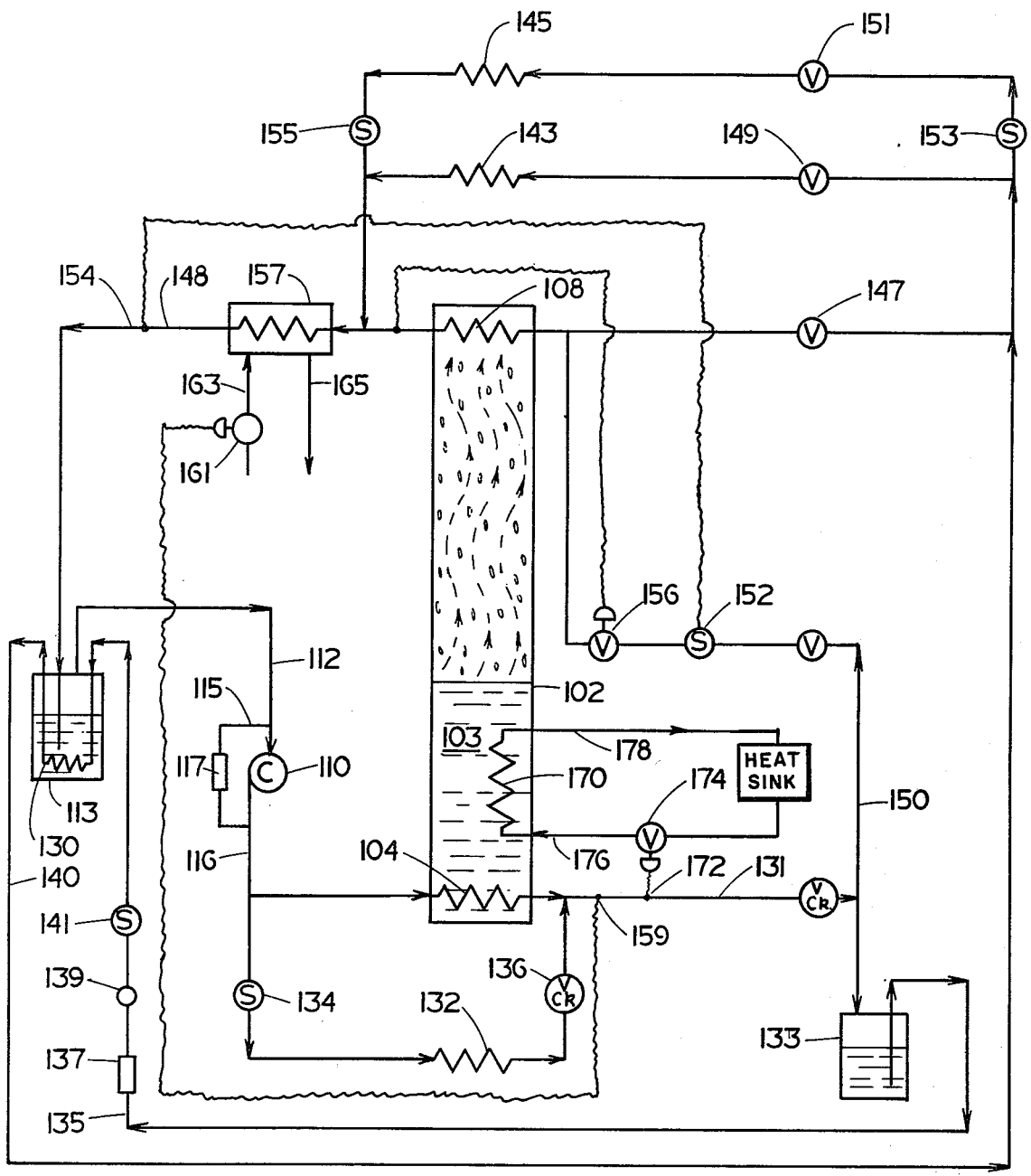
FIG. 1 is a schematic diagram of a preferred vapor generating and recovering apparatus of the present invention.

In FIG. 1, a container 102 for vaporizing a liquid 103 and then condensing the vaporized liquid is provided. Disposed within the liquid and near the bottom of the container 102 is a heating coil 104 which provides heat to vaporize the liquid 103. Heating coil 104 is a condensing coil in a heating and cooling system to be discussed hereinafter.

Disposed within the vapor zone of the container 102 is a cooling coil 108, cooling coil 108 being generally an evaporating coil in a heating and cooling system which will be discussed hereinafter. Cooling coil 108 is provided to maintain a pre-selected temperature in the container below the vaporizing temperature of the liquid.

In the heating and cooling system of FIG. 1, shown schematically, a compressor 110, of the type used in refrigerating systems, compresses a suitable refrigerant which flows to the compressor 110 in a refrigerant section conduit 112. Provided within conduit 112 is a suction accumulator 113 which conditions the refrigerant to compressor 110. Suction accumulator 113 is utilized to provide gaseous refrigerant to compressor 110.

Compressor 110 compresses the suitable gaseous refrigerant to a preselected pressure and the pressurized hot refrigerant gas flows from the compressor 110 through conduit 116 to the heating coil 104, discussed previously, wherein the refrigerant is condensed therein and upon condensing vaporizes the liquid 103 which is disposed within container 102.

A by-pass conduit may also be provided around the compressor 110, the by-pass conduit being exemplified by the numeral 115, the by-pass conduit 115 including a dual pressure control 117 therein. Dual pressure control switch 117 is operable in response to change in the pressure on each side of the compressor 110 and is a feature utilized to shut down the heating and cooling system when the system is being pumped down.

In some devices, it is desired to utilize a plurality of heat emitting chambers and in this instance a plurality of condensing units 132 are utilized and disposed within vaporizing chamber or sub-chambers (not shown) generally similar to container 102. As shown, condensers 104 and 132 are in parallel and a solenoid valve 134 is provided to shut off refrigerant flow to the condenser 132 when the chamber(s) in which the condenser(s) 132 is utilized is not in use. Furthermore, a check valve 136 is provided to prevent back up of refrigerant into condenser 132 when not in use.

The condensed or pressurized liquid refrigerant then flows through conduit 131 to a conventional liquid refrigerant receiver 133. From the liquid refrigerant receiver 133, the refrigerant flows by way of conduit 135 through a drier 137, a moisture indicator 139, a pump down solenoid valve 141, then through a sub-cooling heat exchanger 130 disposed within suction accumulator 113 to sub-cool the liquid refrigerant and super-heat the gaseous refrigerant therein. From the sub-cooler 130 the condensed or pressurized liquid refrigerant flows through conduit 140 to a plurality of thermoexpansion valves and direct expansion evaporating coils in parallel, each thermoexpansion valve being in series with an evaporating coil. Three evaporating coils 108, 143 and 145 with thermoexpansion valves 147, 149 and 151, respectively, are shown in the Figures. Evaporator coil 143 is a convention control evaporator and evaporating coil 145 is a supplementary evaporator and is disposed within a condensing chamber or sub-chamber (not shown) generally similar to container 102. As shown, evaporators 108, 143 and 145 are in parallel and solenoid valves 153 and 155 are provided to shut off refrigeration flow to the supplementary evaporator(s) 145 when the chamber(s) in which the evaporator(s) are disposed are not in use.

The heating and cooling system may also be provided with a heat exchanger 157, heat exchanger 157 being utilized to provide heat to the system transferring said heat from an external source (not shown). In FIG. 1, the heat exchanger 157 is downstream of the parallel evaporators 108, 143, and 145. Heat exchanger 157, being outside container 102, is operable, for example, in response to a pressure control device 159 in the conduit line 131 and, in turn, actuates and controls flow valve 161. Control flow valve 161 is disposed in the inlet water line 163 which feeds water to the heat exchanger 157. An outlet water line 165 is provided for removing the water from the exchanger 157.

Figure 2:
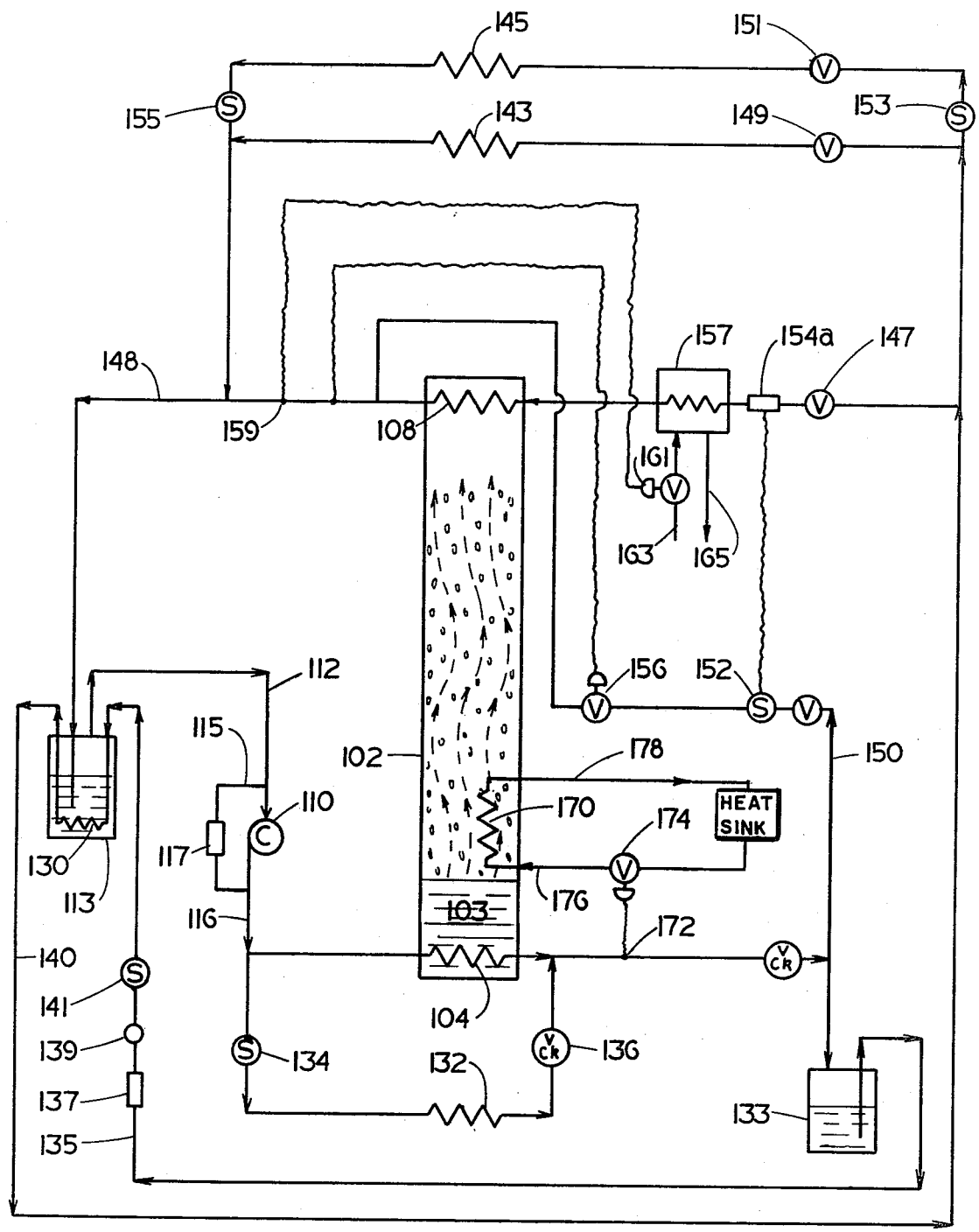
FIG. 2 is a schematic diagram showing one modification of the apparatus of FIG. 1; and, FIG. 3 is a schematic diagram of another preferred vapor generating and recovering apparatus of the present invention.

It is realized that the heat exchanger 157 is shown in FIG. 1 as being in series with and downstream from the main evaporator 108, but it is realized that the heat exchanger 157 may also be upstream of the main evaporator 108 (FIG. 2), as well as in parallel (FIG. 3) therewith, or it may be air-cooled (numeral 161b in FIG. 3) as well as liquid cooled (FIGS. 1 and 2). Even further, the pressure control device 159 may be disposed on the high pressure side of the refrigeration system, as shown in FIG. 1, or on the low pressure side, as shown in FIG. 2. Also, the heat exchanger 157 may be thermostatically controlled by the rise and fall of vapor temperature (numeral 159b in FIG. 3) in the container 102, the temperature change in the low pressure side of the refrigeration system, or the temperature change in the high pressure side of the refrigeration system.

A by-pass conduit 150 may also be provided to by-pass a part of the refrigerant. As shown in the figures, the by-pass 150 is in series with the parallel condensers 104 and 132 and the evaporator 108. By-pass conduit 150 is in parallel with the main flow stream which passes through expansion valves 147, 149 and 151. Flow through conduit 150 is controlled by by-pass solenoid valve 152, which is actuated in response to pressure sensing device 154 which is actuated, in turn, in response to preselected pressure conditions in the flow stream 148, which is the low pressure conduit connecting the evaporators 108, 143, and 145 with the suction accumulator 113. A by-pass valve 156 is also provided and is operable for shutting off the flow through the by-pass 150 if the pressure of the refrigerant in the by-pass 150 exceeds a preselected pressure. It is also realized that the by-pass conduit 150 may enter the low pressure side of the refrigeration system after the evaporator 108 (FIG. 2). The by-pass system may be controlled by a manual control valve, a pressure actuated control valve in response to a preselected pressure condition on either the low pressure side (FIG. 1 as indicated by numeral 154) or the high pressure side (FIG. 2 as indicated by numeral 154a) of the system; or a thermostatic actuated control valve operable in response to the rise and fall of vapor temperatures in the container 102 (FIG. 3 as indicated by numeral 154b) or a preselected temperature in either the low or high pressure side of the system, at, for example, the points indicated by numerals 154 in FIG. 1 and 154a in FIG. 2, respectively.

Figure 3:
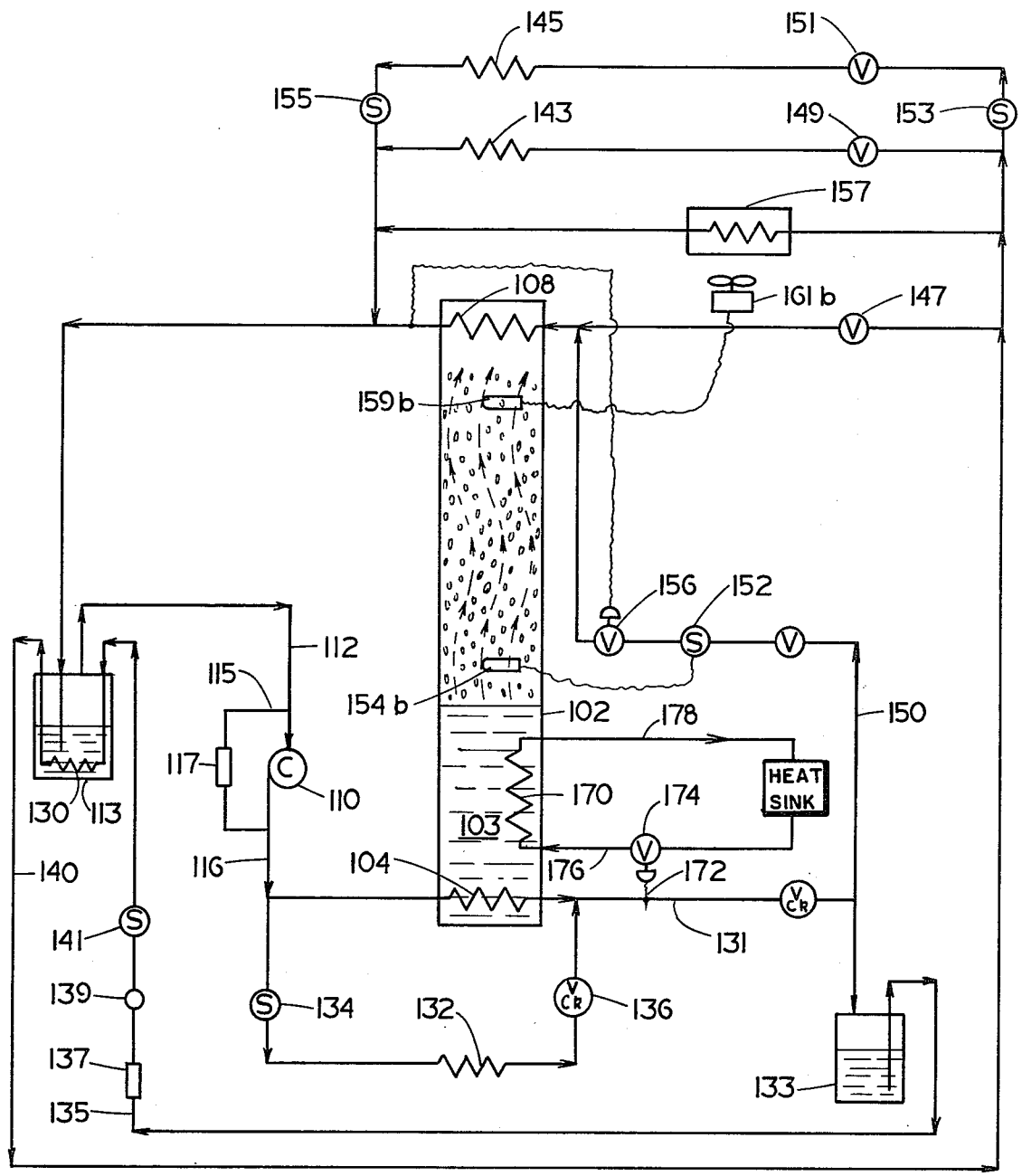

The heating and cooling system is further provided with another heat exchanger 170 which is disposed within container 102 to remove excess heat generated from the high pressure side of the heating and cooling system during vaporization and condensation, transferring said heat to an external source (not shown). In FIGS. 1 and 3, heat exchanger 170 is disposed within the liquid portion of the container 102 and in FIG. 2, heat exchanger 170 is disposed within the vapor zone. Heat exchanger 170 is operable, for example, in response to a pressure control device 172 in the conduit line 131 and, in turn, actuates and controls flow valve 174. Control valve 174 is disposed in the heat transfer fluid line 176 which feeds relatively cold fluid to the heat exchanger 170. An outlet fluid line 178 is provided for removing the heated fluid from the exchanger 170.

It is realized that the pressure control device 172 may be disposed on the low pressure side of the heating and cooling system as well as the high pressure side as shown in the Figures. Also, the heat exchanger 170 may be thermostatically controlled by the rise and fall of vapor temperature in the container 102, the temperature change in the low pressure side of the refrigeration system, or the temperature change on the high pressure side of the refrigeration system.

It will be realized that various changes may be made to the specific embodiments shown and described without departing from the principles and spirit of the present invention.

What is claimed is:

1. In a vapor generating and recovering apparatus for vaporizing a liquid and condensing a vapor, including a housing having at least one compartment therein, said compartment having a liquid and a vapor therein, the improvement comprising:
a heating and cooling system in heat transfer relation with said liquid and said vapor in said compartment, said system including a main condenser in heat emitting relation with said liquid; a main evaporator in heat absorbing relation with said vapor; means to compress a refrigerant, said means to compress being in fluid communication on its high pressure side with said main condenser and on its low pressure side with said main evaporator, said system including expansion means disposed between said main condenser and said main evaporator; and, a first heat exchanger disposed within the liquid zone of said compartment in heat exchange relation with a heat exchanger source outside said heating and cooling system, said first heat exchanger including a heat transfer fluid disposed solely therein to remove heat from said compartment transferring said heat outside said compartment to means to remove heat from said heat transfer fluid, said fluid being independent of said liquid to be vaporized and said refrigerant in said heating and cooling system.

2. In the vapor generating and recovering apparatus of claim 1, said first heat exchanger being water cooled.

3. In the vapor generating and recovering apparatus of claim 1, said first heat exchanger being actuated in response to preselected pressure in said system.

4. In the vapor generating and recovering apparatus of claim 1, said apparatus includes a second heat exchanger in heat emitting relation with said system, said second heat exchanger disposed outside said compartment.

5. In the vapor generating and recovering apparatus of claim 4, said second heat exchanger being in series with said main evaporator.

6. In the vapor generating and recovering apparatus of claim 5, said second heat exchanger being downstream of said main evaporator.

7. In the vapor generating and recovering apparatus of claim 1 including a by-pass system from the high pressure side of said system to the low pressure side of said system.

8. In the vapor generating and recovering apparatus of claim 7 wherein said by-pass is in series with said main evaporator.

9. In the vapor generating and recovering apparatus of claim 7 wherein said by-pass is actuated in response to a preselected pressure sensing means in said system.

10. In the vapor generating and recovering apparatus of claim 9 wherein said preselected pressure sensing means is on the low pressure side of said system.

11. In the vapor generating and recovering apparatus of claim 1 including a refrigerant receiver therein on the high pressure side of said system.

12. In the vapor generating and recovering apparatus of claim 1 including a suction accumulator on the low pressure side of said system.

13. In the vapor generating and recovering apparatus of claim 1 including a second heat exchanger in said system, said second heat exchanger being in heat transfer relation with said accumulator, said second heat exchanger being in series with and disposed between said main condenser and said main evaporator.

* * * * *